April 12, 1955     H. L. BURG     2,705,859
CONTROL FOR POWER LAWN MOWER
Filed Feb. 13, 1953     2 Sheets-Sheet 1
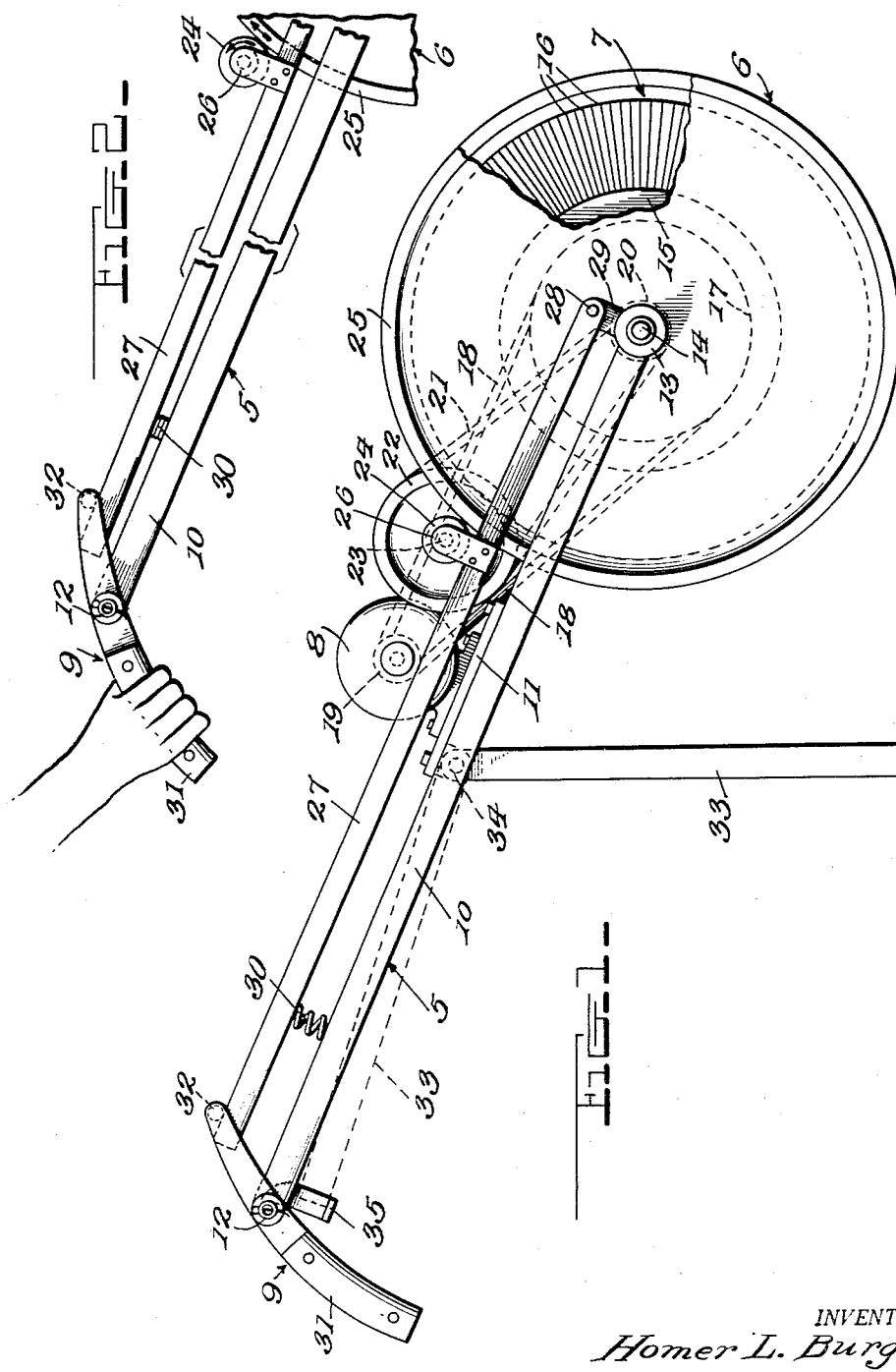
INVENTOR.
Homer L. Burg
BY Bryant & Lowry
attys.

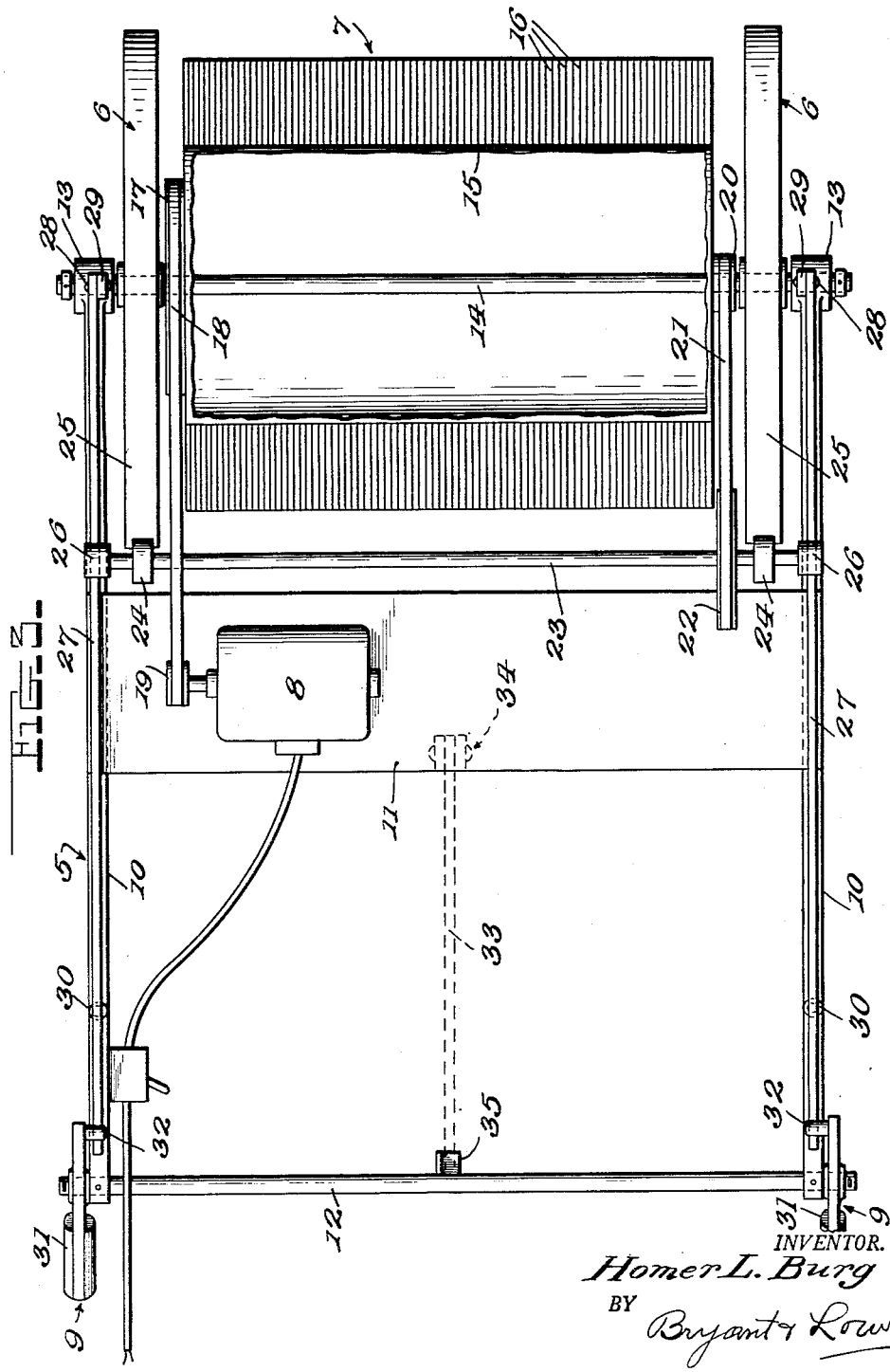

United States Patent Office 2,705,859
Patented Apr. 12, 1955

2,705,859

CONTROL FOR POWER LAWN MOWER

Homer L. Burg, Dallas City, Ill.

Application February 13, 1953, Serial No. 336,808

2 Claims. (Cl. 56—26)

This invention relates to a novel power driven mowing machine which will not require periodic sharpening in order to operate effectively.

The form of the machine herein disclosed includes two ground wheels, and two handles to be supported by the operator who walks behind the machine. However, the invention could be embodied in a mower of a type having a seat for the operator.

The principal object of the invention is to provide a novel mower in which a power driven steel-bristle brush is used in lieu of any edged cutter, said brush serving to cut or tear off the grass.

Another object of the invention is to provide a novel mower in which the driven rotary brush constitutes one element of the driving means for the ground wheels of the mower.

A further object of the invention is to provide individual friction drives for the two ground wheels of the machine and novel means whereby the drive for either wheel may be discontinued at will to cause the other wheel to drive the machine on an arc. This will aid in turning corners and effecting other abrupt steering although most of the required steering may be accomplished by simply urging the two supporting handles laterally to the right or left.

A still further object of the invention is to provide the machine with right and left hand-grips which the operator holds in his hands to support the rear end of the machine during use, and to make novel provision whereby the friction drives for the ground wheels are controlled by these hand-grips.

Yet another object of the invention is to provide a novel foldable leg to support the rear end of the machine while not in operation and when starting the motor if the latter be of internal combustion type.

With the above and other objects in view that will become apparent as the nature of the invention is better understood, the same consists in the novel form, combination and arrangement of parts hereinafter more fully described, shown in the accompanying drawings, and claimed.

In the drawings:

Figure 1 is a side elevation, partly broken away, the foldable leg being in its operative position and the friction drive being disengaged;

Figure 2 is a fragmentary view similar to a portion of Figure 1 but illustrating the manner in which the friction drive becomes engaged when the operator supports the rear end of the machine by means of the hand-grips; and Figure 3 is a plan view, most of the upper half of the rotary brush being broken away.

The construction shown in the drawings may be considered as preferred and while that construction will be rather specifically described, it is to be understood that variations may be made within the scope of the invention as claimed.

An elongated carriage frame 5 is supported at its front end by ground wheels 6, and a rotary grass-mowing steel brush 7 is mounted at said front end of said frame 5. This frame supports a motor 8 (gas or electric) and this motor supplies the power for driving the brush 7 and the ground wheels 6. The drive for these wheels is of friction type and is controlled by two pivoted handles 9 by means of which the operator supports the rear end of the frame 5 during use of the machine.

The frame 5 includes two longitudinal side bars 10 rigidly connected between their ends by a transverse plate 11 which supports the motor 8. The rear ends of the side bars 10 are connected by a transverse handle bar 12 and the front ends of said side bars 10 are provided with alined bearings 13. These bearings 13 receive the ends of an axle 14 on which the wheels 6 and the brush 7 are mounted.

The brush 7 comprises a drum 15 and spring steel bristles 16 suitably secured to and radiating from said drum. On one end of the drum 15, a pulley 17 is secured, said pulley being connected by a belt 18 with a pulley 19 on the shaft of the motor 8. On the other end of the drum 15, another pulley 20 is secured. This pulley 20 is connected by a belt 21 with a pulley 22 on a transverse shaft 23, and this shaft 23 carries friction wheels 24 for engagement with the tires 25 of the wheels 6.

The ends of the shaft 23 are mounted in bearings 26 which are secured to two elongated levers 27 which extend longitudinally about the frame side bars 10. The front ends of the levers 27 are fulcrumed at 28 to lugs 29 which project upwardly from the bearings 13. The rear ends of the levers 27 are supported by coiled springs 30 which are capable of holding said levers in the upwardly swung position of Figure 1, and when said levers are in this position, they support the friction wheels 24 slightly above the wheel tires 25. The rear ends of the levers 27 are operatively associated with the pivoted handles 9 in such manner that when the operator supports the rear end of the machine by means of said handles, the latter depress said rear ends of said levers 27 as seen in Figure 2. This downward swinging of the levers 27 brings the friction wheels 24 into contact with the tires 25 of the wheels 6 to propel the machine.

Each of the pivoted handles 9 is in the form of a curved forwardly inclined lever fulcrumed between its ends, said lever having a hand-grip 31 at its rear end and having a lateral roller or the like 32 at its front end. The two handles 9 are fulcrumed on the ends of the handle bar 12 and their rollers 32 lie upon the rear ends of the levers 27. Thus, when the operator takes the hand-grips 31 in his hands and thus supports the weight of the rear end of the machine, the handles 9 swing about their fulcrums and downwardly swing the levers 27 to engage the friction wheels 24 with the tires 25 to propel the machine.

To support the rear end of the machine while not in use or when starting the motor, a leg 33 has been shown. This leg is pivoted at 34 to the motor supporting plate 11 and when not in use it may be swung upwardly and suitably held. A rigid hook 35 has been shown, secured to the handle bar 12 for this purpose. The leg 33 may be swung into and out of engagement with this hook 35 as required.

The motor 8 is started while the rear end of the machine is supported by the leg 33. The belt-and-pulley drive 17, 18, 19 then drives the brush 7, and the belt-and-pulley drive 20, 21, 22 drives the shaft 23 and the friction wheels 24. However, the levers 27 are then supporting the shaft 23 at such a height that the friction wheels 24 are out of contact with the wheels 6 and consequently the machine will not be propelled. When propulsion is desired, the operator first grips the handle bar 12 to take the weight off the leg 33 and then folds this leg and engages it with the hook 35. The operator then grips the hand-grips 31 of the two handles 9 and thus supports the weight of the rear end of the machine. As soon as this is done, the handles 9 depress the lever 27 as shown in Figure 2, thus bringing the friction wheels 24 against the wheels 6 and causing propulsion of the machine. During this propulsion, the rapidly driven (about 300 R. P. M.) steel bristle brush 7 cuts or tears off the grass and performs a satisfactory mowing job even though it lacks actual cutting edges. It is the impact of the ends of the spring steel bristles 16 against the blades of grass that completely severs some of the blades and so weakens the others that they will be torn in two at the weakened zones.

During operation, whenever an abrupt turn is to be made, the operator allows the handle 9, on one side of the machine or the other, to swing to its Figure 1 position, thus releasing the drive on one wheel of the machine while continuing to drive the other wheel, thereby aiding in making the turn.

Insofar as performance of a mowing operation by means of a rotary brush is concerned, it is to be understood that any suitable brush mounting carriage and any appropriate brush-driving ground wheel driving means could be employed. Also, it will be seen that the handle-controlled propelling means could well be employed even if some other form of cutting means were used instead of a rotary brush. Therefore, while both of these features are preferably embodied in the one machine, the invention is not limited to this. Moreover, it is to be understood that various changes may be made within the scope of the invention as claimed.

I claim:

1. A mowing machine comprising an axle having ground wheels, a rotary brush mounted on said axle between said wheels, a carriage frame having its front end mounted on said axle, the sides of said frame having handle means, a motor mounted on said frame, means operatively connecting said motor with said brush, lever means overlying said handle means and pivotally mounted at their lower ends on said frame, resilient means for normally spacing said lever means over said handle means, roller means mounted on said lever means adjacent the rims of said wheels for frictionally driving said wheels when said lever means are pressed toward said handle means, pulleys on said roller means and said rotary brush and a belt over said pulleys for driving said roller means from said rotary brush.

2. A mowing machine as defined in claim 1, and pivoted hand grips at the rear ends of said handle means having lugs extending over the outer ends of said lever means for depressing the latter automatically upon lifting said frame by means of said hand grips.

References Cited in the file of this patent

UNITED STATES PATENTS

| | | |
|---|---|---|
| 430,205 | Eddy | June 17, 1890 |
| 630,689 | Gries | Aug. 8, 1899 |
| 1,167,051 | Doak | Jan. 4, 1916 |
| 1,683,183 | Herr | Sept. 4, 1928 |
| 2,070,288 | Mack | Feb. 9, 1937 |
| 2,205,249 | Fitzgerald et al. | June 18, 1940 |
| 2,528,041 | Davis | Oct. 31, 1950 |
| 2,623,343 | Timmins | Dec. 30, 1952 |
| 2,663,137 | Asbury | Dec. 22, 1953 |

FOREIGN PATENTS

| | | |
|---|---|---|
| 13,193 | Australia | Apr. 16, 1929 |